(12) United States Patent  
Chatterjee et al.

(10) Patent No.: US 8,775,786 B1  
(45) Date of Patent: *Jul. 8, 2014

(54) BOOT CACHING FOR BOOT ACCELERATION WITHIN DATA STORAGE SYSTEMS

(71) Applicant: American Megatrends, Inc., Norcross, GA (US)

(72) Inventors: Paresh Chatterjee, Fremont, CA (US); Srikumar Subramanian, Newark, CA (US); Suresh Grandhi, Fremont, CA (US); Vijayarankan Muthirisavenugopal, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,400

(22) Filed: Jan. 8, 2013

Related U.S. Application Data

(63) Continuation of application No. 12/355,439, filed on Jan. 16, 2009, now Pat. No. 8,352,716.

(60) Provisional application No. 61/021,483, filed on Jan. 16, 2008, provisional application No. 61/076,923, filed on Jun. 30, 2008.

(51) Int. Cl.  
*G06F 1/00* (2006.01)

(52) U.S. Cl.  
USPC ................................. 713/2; 713/1; 711/147

(58) Field of Classification Search  
CPC ............................. G06F 9/4401; G06F 9/4416  
USPC ............ 713/1, 2; 711/147; 709/217, 218, 219  
See application file for complete search history.

(56) References Cited

U.S. PATENT DOCUMENTS

| | | | |
|---|---|---|---|
| 4,942,579 A | 7/1990 | Goodlander et al. |
| 4,972,316 A | 11/1990 | Dixon et al. |
| 5,060,144 A | 10/1991 | Sipple et al. |
| 5,257,367 A | 10/1993 | Goodlander et al. |
| 5,353,430 A | 10/1994 | Lautzenheiser |
| 5,579,516 A | 11/1996 | Van Maren et al. |
| 5,619,690 A | 4/1997 | Matsumani et al. |

(Continued)

OTHER PUBLICATIONS

U.S. Appl. No. 12/498,599, filed Jul. 7, 2009, entitled "Method, System, Apparatus, and Computer-Readable Medium for Implementing Caching in a Storage System," Inventors: Chatterjee et al.

(Continued)

*Primary Examiner* — Jaweed A Abbaszadeh  
(74) *Attorney, Agent, or Firm* — Meunier Carlin & Curfman, LLC

(57) ABSTRACT

Technologies are described herein for boot caching to accelerate boot access in a data storage system providing boot consolidation. Boot caching may be provided to improve boot access for multiple clients concurrently booting from a common storage server. Boot statistics may be collected per user or client. The boot statistics can determine common patterns within the boot procedures of the clients and may be used to compute boot caching tables. These tables may then be used during boot caching to accelerate booting of clients. A boot caching mechanism can be implemented to support improved booting performance by caching data blocks common to multiple booting volumes. This approach can leverage the condition that much of the data loaded by clients at boot time may be substantially identical, because booting can involve loading the same operating system components into each client.

20 Claims, 10 Drawing Sheets

(56) References Cited

U.S. PATENT DOCUMENTS

| | | | |
|---|---|---|---|
| 5,720,027 | A | 2/1998 | Sarkozy et al. |
| 5,732,238 | A | 3/1998 | Sarkozy |
| 5,761,709 | A | 6/1998 | Kranich |
| 5,778,430 | A | 7/1998 | Ish et al. |
| 5,790,774 | A | 8/1998 | Sarkozy |
| 5,809,560 | A | 9/1998 | Schneider |
| 5,822,773 | A | 10/1998 | Pritchard et al. |
| 5,884,093 | A | 3/1999 | Berenguel et al. |
| 5,893,919 | A | 4/1999 | Sarkozy et al. |
| 6,038,570 | A | 3/2000 | Hitz et al. |
| 6,098,128 | A | 8/2000 | Velez-McCaskey et al. |
| 6,205,450 | B1 | 3/2001 | Kanome |
| 6,216,207 | B1 | 4/2001 | Miller et al. |
| 6,389,513 | B1 | 5/2002 | Closson |
| 6,591,334 | B1 | 7/2003 | Shyam et al. |
| 6,591,347 | B2 | 7/2003 | Tischler et al. |
| 7,043,637 | B2 * | 5/2006 | Bolosky et al. ............... 713/171 |
| 7,051,165 | B2 | 5/2006 | Kimura et al. |
| 7,197,606 | B2 | 3/2007 | Kobayashi et al. |
| 7,246,208 | B2 | 7/2007 | Hoshino et al. |
| 7,249,218 | B2 | 7/2007 | Gibble et al. |
| 7,308,536 | B2 | 12/2007 | Arimilli et al. |
| 7,359,937 | B2 | 4/2008 | Douceur et al. |
| 7,398,382 | B2 | 7/2008 | Rothman et al. |
| 7,424,514 | B2 | 9/2008 | Noble et al. |
| 7,454,571 | B1 | 11/2008 | Sucharitakul |
| 7,457,934 | B2 | 11/2008 | Yagawa |
| 7,487,342 | B2 | 2/2009 | Cronk et al. |
| 7,607,000 | B1 | 10/2009 | Smith et al. |
| 7,737,673 | B2 | 6/2010 | Xi et al. |
| 7,840,537 | B2 * | 11/2010 | Gokhale et al. ............... 707/652 |
| 7,899,789 | B2 | 3/2011 | Schwaab et al. |
| 7,930,312 | B2 | 4/2011 | Hild et al. |
| 8,001,323 | B2 | 8/2011 | Honma |
| 8,332,844 | B1 * | 12/2012 | Kulkarni et al. ............... 717/176 |
| 2003/0126242 | A1 | 7/2003 | Chang |
| 2003/0142561 | A1 | 7/2003 | Mason et al. |
| 2006/0288202 | A1 | 12/2006 | Doran et al. |
| 2007/0192763 | A1 | 8/2007 | Helvick |
| 2008/0005141 | A1 | 1/2008 | Zheng et al. |
| 2008/0243879 | A1 * | 10/2008 | Gokhale et al. ............... 707/100 |
| 2010/0017591 | A1 | 1/2010 | Smith et al. |

OTHER PUBLICATIONS

U.S. Appl. No. 12/435,602, filed Aug. 28, 2008, entitled "Boot Acceleration by Consolidating Client Specific Boot Data in a Data Storage System," Inventors: Chatterjee et al.

U.S. Official Action dated Sep. 19, 2011 in U.S. Appl. No. 12/435,602.

U.S. Appl. No. 12/200,279, filed Aug. 28, 2008, entitled "Eliminating Duplicate Data in Storage Systems With Boot Consolidation," Inventors: Chatterjee et al.

U.S. Official Action, dated Mar. 1, 2012, received in connection with related U.S. Appl. No. 12/200,279.

U.S. Official Action dated Aug. 27, 2009 in U.S. Appl. No. 11/450,594.

U.S. Notice of Allowance / Allowability dated Oct. 29, 2009 in U.S. Appl. No. 11/450,518.

U.S. Appl. No. 11/450,518, filed Jun. 9, 2006 entitled "Method, System, Apparatus, and Computer-Readable Medium for Integrating a Caching Module into a Storage System Architecture," Inventors: Chatterjee et al.

U.S. Official Action dated May 11, 2009 in U.S. Appl. No. 11/450,518.

U.S. Official Action dated Feb. 21, 2008 in U.S. Appl. No. 11/450,518.

U.S. Official Action dated Sep. 30, 2008 in U.S. Appl. No. 11/450,518.

U.S. Appl. No. 11/450,594, filed Jun. 9, 2006 entitled "Method, System, Apparatus, and Computer-Readable Medium for Implementing Caching in a Storage System," Inventors: Chatterjee et al.

U.S. Official Action dated Mar. 4, 2008 in U.S. Appl. No. 11/450,594.

U.S. Official Action dated Sep. 30, 2008 in U.S. Appl. No. 11/450,594.

U.S. Official Action dated Mar. 16, 2009 in U.S. Appl. No. 11/450,594.

U.S. Appl. No. 12/104,116, filed Apr. 16, 2008 entitled "Writable Snapshots for Boot Consolidation," Inventors: Chatterjee et al.

"Elementary Data Structures," http://www2.toki.or.id/book/AlgDesignManual/LEC/LECTUR17/NODE7.HTM, Jun. 2, 1997, accessed Feb. 29, 2008, 10 pages.

* cited by examiner

| BOOT PATTERN STATISTICS TABLE 310 | | | |
|---|---|---|---|
| START LBA | NUM OF SECTORS | START TIME | I/O TYPE |
| | | | |
| | | | |
| | | | |
| | | | |
| | | | |
| | | | |
| | | | |
| | | | |

BOOT ENTRY ARRAYS

| REFERENCE VOLUME INDEX 510 | | DEPENDENT VOLUME INDEX 520 | |
|---|---|---|---|
| 2 | CRC1 | 4 | CRC1 |
| 3 | CRC2 | 10 | CRC3 |
| 15 | CRC4 | 4 | CRC4 |
| 20 | CRC5 | 8 | CRC6 |
| 21 | CRC6 | 21 | CRC7 |
| 27 | CRC7 | 50 | CRC8 |

| | | | |
|---|---|---|---|
| N-1 | CRC-M | M-1 | CRC-M |
| N | CRC-N | M | CRC-N |

REFERENCE VOLUME SLT TABLE 630

| SLT ENTRY NUM | START BLOCK | LENGTH | BITMAP INDEX |
|---|---|---|---|
| 1 | 1 | 2 | 0 |
| 2 | 5 | 1 | 2 |
| 3 | 7 | 3 | 3 |

REFERENCE VOLUME BAP TABLE 620

| | |
|---|---|
| 1 | |
| 2 | |
| 5 | |
| 7 | |
| 8 | |
| 9 | |
| ... | |
| N-1 | |
| N | NUM OF MATCHING ENTRIES |

REFERENCE BLOCK ARRAY 610

| |
|---|
| 1 |
| 2 |
| 5 |
| 7 |
| 8 |
| 9 |
| ... |
| N-1 |
| N |

DEPENDENT VOLUME SLT TABLE 730

| SLT ENTRY NUM | START BLOCK | LENGTH | BITMAP INDEX |
|---|---|---|---|
| 1 | 4 | 2 | 0 |
| 2 | 6 | 1 | 3 |
| 3 | 10 | 2 | 4 |

DEPENDENT VOLUME BAP TABLE 720

| 1 | 2 | 7 | 8 | 9 | ... | X-1 | X |
|---|---|---|---|---|---|---|---|
| 4 | 5 | 6 | 10 | 11 | ... | M-1 | M |

NUM OF MATCHING ENTRIES

REFERENCE BLOCK ARRAY 610

| 1 | 2 | 5 | 7 | 8 | 9 | ... | N-1 | N |

700

BOOT CACHING FOR BOOT ACCELERATION WITHIN DATA STORAGE SYSTEMS

CROSS-REFERENCE TO RELATED APPLICATION

This application is a continuation of U.S. patent application Ser. No. 12/355,439, filed on Jan. 16, 2009, entitled "Boot Caching for Boot Acceleration within Data Storage Systems," and claims the benefit of U.S. provisional patent application No. 61/021,483, filed on Jan. 16, 2008, entitled "Boot Access Accelerator," and U.S. provisional patent application No. 61/076,923, filed on Jun. 30, 2008, entitled "Boot Acceleration in a Consolidated Storage System," the disclosures of which are expressly incorporated herein by reference in their entireties.

BACKGROUND

Storage consolidation can support centralizing and sharing storage resources among multiple data storage systems. Storage consolidation architectures can address limitations associated with locally attached storage and address growing data storage demands of information rich business environments.

One such architecture may use storage servers or storage area network (SAN) based storage consolidation. A single server or SAN device may contain multiple volumes that may be mapped to various user systems. For example, in an enterprise with hundreds of users, a single storage server may be used to host a volume for each user to boot and execute software from. The user machines may be thin clients connecting to their storage volumes over a network. Thus all of the enterprise storage may be consolidated in one, or a few, storage servers improving manageability of storage resources.

Since storage consolidation may involve one, or few, storage servers answering to multiple clients, hard disk access at the server or SAN devices may significantly increase. This may be particularly so during peak times for the booting of clients, such as in the morning. These clustered boot operations may reduce the client boot time and negatively affect productivity.

It is with respect to these considerations and others that the disclosure made herein is presented.

SUMMARY

Technologies are described herein for boot caching to accelerate boot access in a data storage system providing boot consolidation. Through the utilization of the technologies and concepts presented herein, boot caching may be provided to improve boot access for multiple clients concurrently booting from a common storage server.

According to one aspect presented herein, boot statistics may be collected per user or client. Input/output (I/O) operations from clients may be monitored during boot periods. This monitoring can determine common patterns within the boot procedures of the clients.

According to another aspect, statistical boot data may be used to compute boot caching tables. These tables may then be used during boot caching to accelerate booting of clients.

According to yet another aspect, a boot caching mechanism can be implemented to support improved booting performance by caching data blocks common to multiple booting volumes. This approach can leverage the condition that much of the data loaded by clients at boot time may be substantially identical, because booting can involve loading the same operating system components into each client.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a data structure diagram illustrating a boot pattern statistics table according to embodiments presented herein;

FIG. 4 is a data structure diagram illustrating bitmaps for determining pure read I/O operations according to embodiments presented herein;

FIG. 5 is a data structure diagram illustrating boot entry arrays according to embodiments presented herein;

FIG. 6 is a data structure diagram illustrating tables generated with respect to a reference volume for use in boot acceleration according to embodiments presented herein;

FIG. 7 is a data structure diagram illustrating tables generated with respect to each dependent volume for use in boot acceleration according to embodiments presented herein;

DETAILED DESCRIPTION

Figure 1:
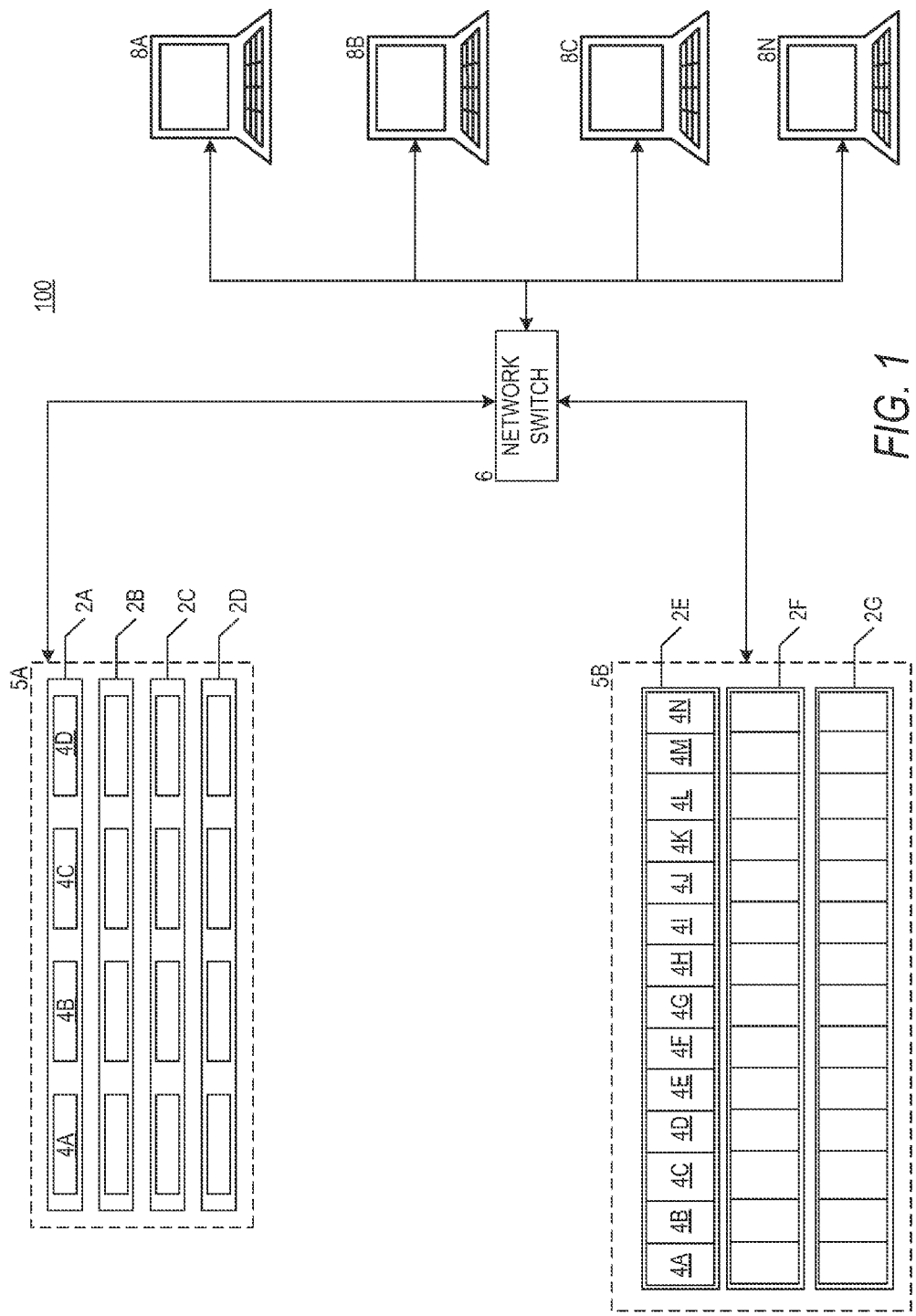
FIG. 1 is a network architecture diagram illustrating aspects of a storage system according to embodiments presented herein.

The following detailed description is directed to technologies for boot acceleration using boot caching in a data storage system. Through the use of the embodiments presented herein, technologies for caching boot blocks within a networked data storage system can support accelerated booting from volumes within the data storage system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for boot acceleration using boot caching in a data storage system will be described.

Turning now to FIG. 1, details will be provided regarding an illustrative operating environment for the implementations presented herein, as well as aspects of several software components that provide the functionality described herein. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface (iSCSI) protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Modules for high-performance and space efficient journaling may be provided on one or more storage server computers 2A-2G, or one or more storage clusters 5A-5B. Furthermore, the processes for implementing high-performance and space efficient journaling may execute on any of these systems or may operate in a distributed fashion with components executing across two or more of these systems.

Figure 2:
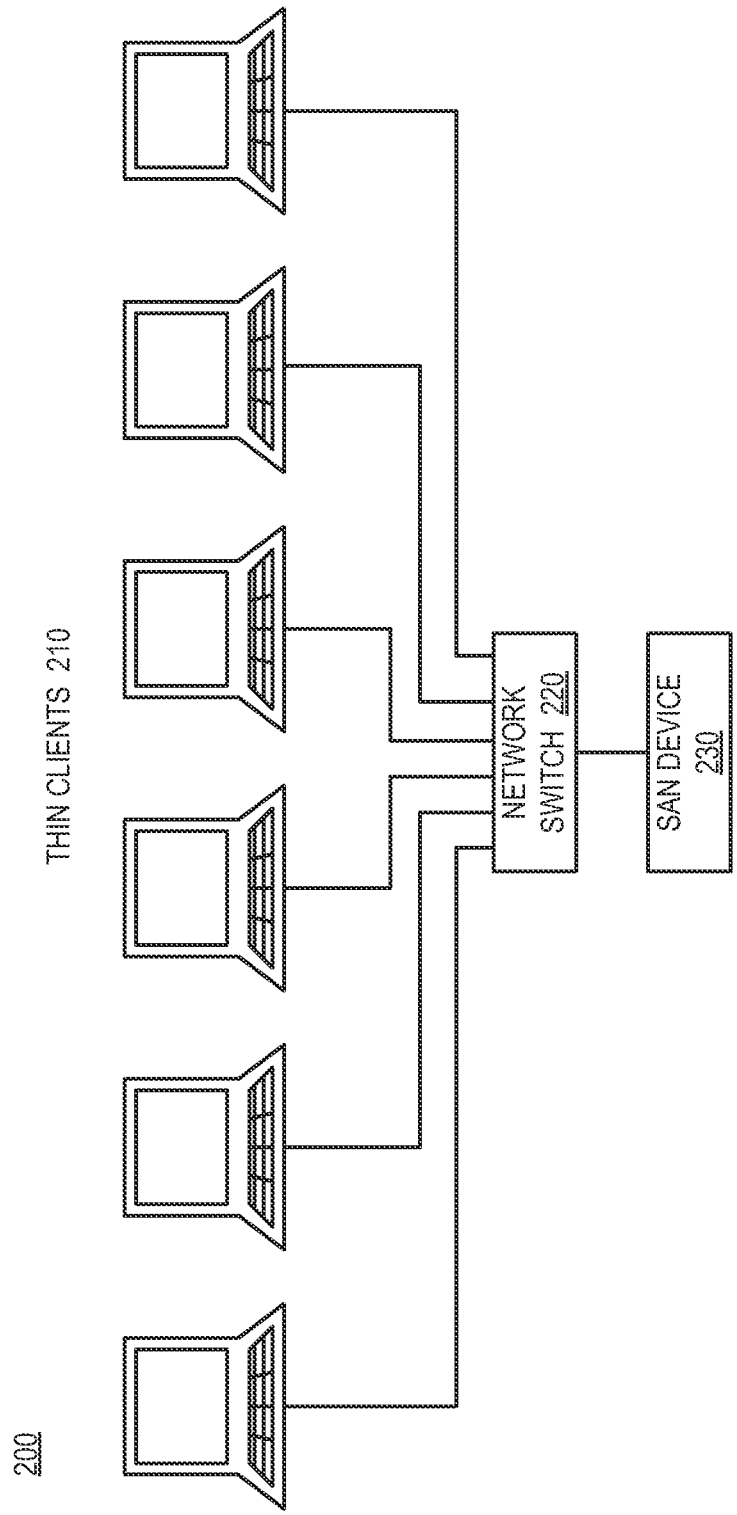
FIG. 2 is a block diagram illustrating a network of thin clients configured to boot and execute from storage volumes provided within a storage area network device according to embodiments presented herein.

Referring now to FIG. 2, a block diagram 200 illustrates a network of thin clients 210 configured to boot and execute from storage volumes provided within a storage area network device 230 according to embodiments presented herein. Traffic on the computer network may be controlled using a network switch 220. One or more thin clients 210 can operate on a computer network. The thin clients 210 may be examples of, or similar to, imitators 8 as discussed with respect to FIG. 1. Generally, thin clients 210 may operate without local storage drives, instead mounting a volume within a remote server or storage system such as the storage area network (SAN) device 230. The SAN device 210 may be a virtualized cluster 5 or storage node 2 as discussed with respect to FIG. 1, or any other network attached storage server, storage device, or data storage system.

The thin clients 210 may use storage volumes provided on the SAN device 230 as their primary storage devices for booting, software execution, and data storage. The thin clients 210 can boot from their volumes contained on the SAN device 230. To reduce boot delay experienced at the thin clients 210 due to hard disk access time, the process of booting from volumes on the SAN device 230 may be accelerated.

A mechanism to accelerate the boot process may use an enhanced cache referred to as a boot cache. The SAN device 230 can provide boot volumes for use across multiple thin clients 210. Servicing blocks associated with more than one thin client 210 from common cached blocks can reduce disk drive access and improve efficiency at the SAN device 230. Such boot caching can significantly improve average boot time at the thin clients 210.

Boot acceleration may be provided in two stages. The first stage of boot acceleration may be considered boot sequence analysis. During boot sequence analysis, input/output (I/O) operations from the thin clients 210 to the SAN device 230 may be monitored. This monitoring can determine common patterns within the boot procedures of the thin clients 210. Statistical boot data may be collected by monitoring the boot procedures of thin clients 210. The statistical boot data may be used to determine boot acceleration tables. These boot acceleration tables may then be used in the second stage of boot acceleration where boot caches are created to accelerate booting of the thin clients 210.

Boot data collection for a particular volume may begin when that volume is mounted for use. Data collection may continue until a specified number of I/O statistics have been collected. Data collection may also continue for a specified period of time. The number of I/O statistics collected or the time period used to collect boot data may be determined by observing the booting characteristics of the thin clients 210. According to one embodiment, 50,000 I/O operations of boot data may be collected for booting a particular operating system. According to another embodiment, or 3 minutes worth of boot data may be collected.

One or more software modules operating on the SAN device 230 can intelligently determine when a thin client 210 is booting. Booting can be identified at the SAN device 230 using any one of, or a combination of, indicators. An example of a boot indicator can include the client logging in or initially connecting. Another example of a boot indicator can include the client logging in or initially connecting followed immediately by a read from a boot sector or sector zero of the associated volume. Another example of a boot indicator can include detecting a specific disk read pattern employed during the boot process. Another example of a boot indicator can involve detecting specific SCSI commands used during the boot process such as "read capacity," or "report LUNs," or similar drive controller hardware commands. Several other boot indicator examples can be employed alone or in combination by the SAN device 230 to determine that a thin client 210 is booting from a volume image on SAN device 230.

A boot cache can operate without the strict cache line replacement mechanism typically used with the rest of the cache. That is, the typical least recently used (LRU) replacement algorithm need not be followed by the boot cache. The memory used by the boot cache can be released back to the normal operating memory pool after the final boot from a thin client 210 has completed. There may be a fixed amount of time between the completion of the last boot and the release of the boot cache memory. For example, this time may be configured to be one hour or any other amount of time. The specific reservation of a special purpose boot cache can reserve the boot cache blocks for the duration necessary for many, or all, of the thin clients 210 to complete booting from the boot cache. As the day proceeds and the clients are booted, the boot cache blocks can be released back to the generic cache pool or system memory.

Since one thin client 210 may write into the boot data area of its volume, the sectors that have been written to may no longer be identical across all of the volumes associated with the thin clients 210. The boot cache can track the coherency of the cached boot data across all of the volumes. If a write occurs to a single volume in one or more sectors that are accessed during booting, the information related to that write can be maintained so that all future reads from those sectors by that particular client may be met straight from the disk instead of through the boot cache. The information related to the write can be maintained in both a data structure and also logged to disk in order to persist the information. If a particular sector becomes incoherent for a sufficient number of thin clients 210, that sector may be altogether removed from the list of sectors included in the special boot cache. Thus, the sectors that are different for several of the thin clients 210 may be treated as normal data reads from their respective volumes.

Furthermore, all of the boot volumes on a SAN device 230 may be written with the same data. For example, a security patch may be equally applied to the volumes associated of several of the thin clients 210. Such an update may involve writes to the boot cache. The boot cache can keep track of any loss of coherency as discussed above. The boot cache can also detect the reappearance of coherence due to the same data being written to multiple volumes. If a critical number of volumes are written to with the same data, the sector can be placed back into the coherency list of sectors to be cached into the boot cache. Such a mechanism to detect multiplicity of boot data can further improve boot block acceleration.

Only specific sectors that are used in common between the thin clients 210 can be included into the boot cache. Which sectors this includes may be automatically learned by the boot caching system when a thin client 210 is booted up the first time. The results of this automatic learning can be persisted to disk so that it need not be repeated each time. The results of the automatic learning can also updated whenever writes to the boot cache invalidate the coherence of multiple volumes.

Turning now to FIG. 3, a data structure diagram 300 illustrates a boot pattern statistics table 310 according to embodiments presented herein. The boot pattern statistics table 310 may be created and populated with boot I/O statistics during the boot statistics collection stage. Each entry of the boot pattern statistics table 310 may include a field for a start logical block address (LBA). The start LBA can indicate the beginning LBA within the storage drive for the I/O operation associated with the entry. Each entry in the boot pattern statistics table 310 may also include a field for a quantity of sectors. This quantity can represent the size of the I/O operation associated with the entry. Each entry of the boot pattern statistics table 310 may also include a field for a start time. This start time may indicate the time stamp of the I/O operation associated with the entry. Each entry of the boot pattern statistics table 310 may also include a field for an I/O type value. The I/O type can specify whether the I/O is read I/O or a write I/O. While boot statistics are being collected, each I/O operation can cause a new entry associated with that operation to be added to the boot pattern statistics table 310.

Figure 4:
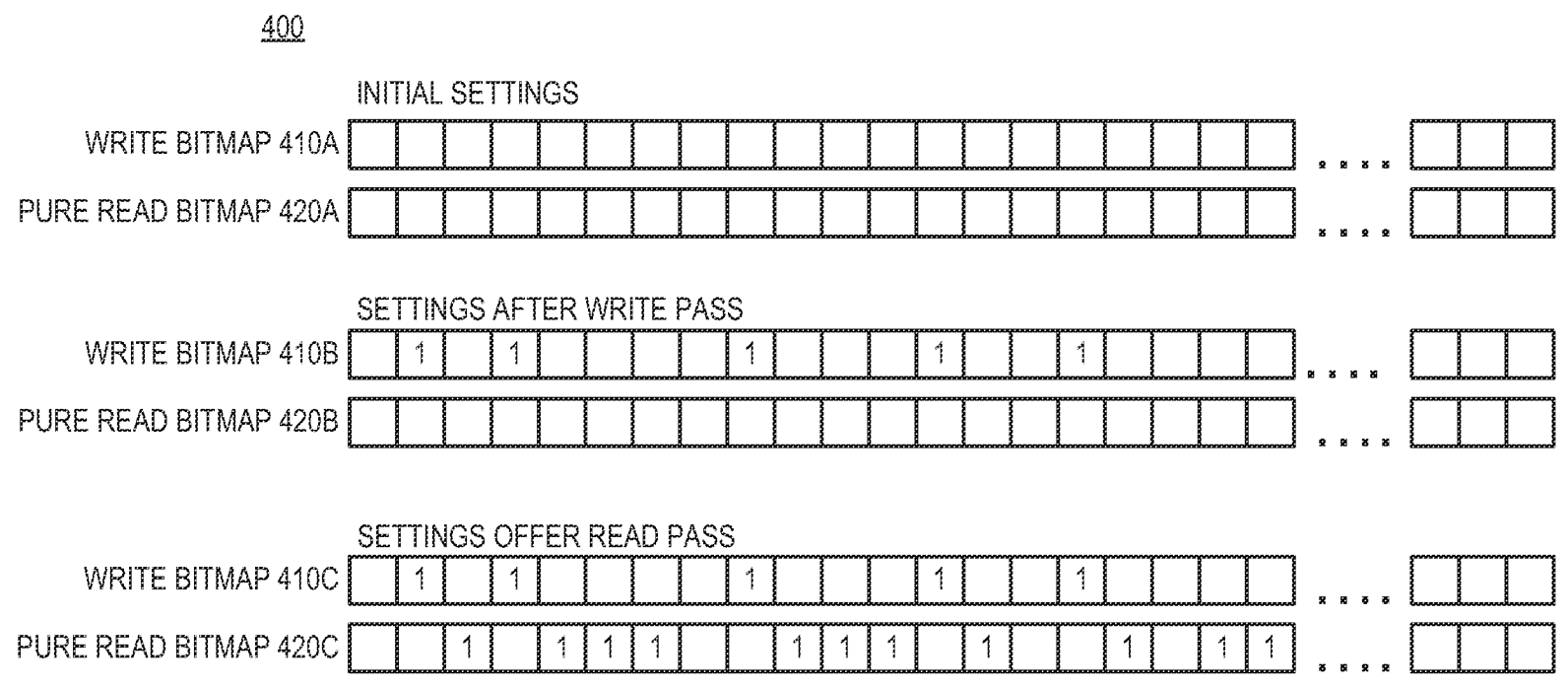

Turning now to FIG. 4, a data structure diagram 400 illustrates bitmaps for determining pure read I/O operations according to embodiments presented herein. The initial settings or empty structures are provided as a write bitmap 410A and a pure read bitmap 420A. Each bit in these bitmaps can represent a block of the corresponding volume. Each block may represent 4 KB in size according to one embodiment, but the blocks may also be any other size. Each bitmap can contain enough blocks to represent the entire volume. The bitmaps may be populated using two passes through the boot pattern statistics table 310.

During a first pass, or write pass, through the boot pattern statistics table 310, bits may be set in the write bitmap 410B to indicate a write to the corresponding blocks. The pure read bitmap 420B may not be involved in the first pass, or write pass, through the boot pattern statistics table 310. At the completion of the write pass through the boot pattern statistics table 310, bits of the write bitmap 410B may have been set when these bots correspond to a storage block receiving a write I/O during the boot statistics collection period. Hence the first pass being the write pass.

During the second pass, or read pass, through the boot pattern statistics table 310, bits in the pure read bitmap 420C may be set high when a read I/O targeted the block corresponding to that bit. Even though a read may occur within the corresponding block, the bit of the pure read bitmap 420C may not be set high if the corresponding bit in the write bitmap 410C was set high during the write pass. Accordingly, bits set too high in the pure read bitmap 420C upon the completion of the read pass correspond to blocks that received only reads, and no writes, during the boot statistics collection period. Such block is referred to as a pure read block.

Turning now to FIG. 5, a data structure diagram 500 illustrates boot entry arrays according to embodiments presented herein. A reference volume index 510 can store an entry for each block of a reference volume that is associated with a pure read as discussed with respect to FIG. 4. The reference volume is the volume from which cache entries are loaded. Generally, the reference volume may be the volume with most number of blocks matching blocks within other volumes. Options for selecting the reference volume are discussed in detail below. Volumes other than the reference volume may be referred to as dependent volumes, or incoming volumes.

Each entry of the reference volume index 510 can contain a block number referring to the bucketized block of storage capacity. Each entry of the reference volume index 510 may also contain a signature, such as a cyclic redundancy check (CRC). The CRC may be calculated over the block associated with the block number. Similarly, a dependent volume index 520 may be associated with each one of the other volumes to be matched against the reference volume. Each entry of the dependent volume index 520 can have a same block number and CRC field just as the entries of the reference volume index 510. Entries in both the reference volume index 510 and each of the reference volume indices 520 may be sorted by signature. For example, they may be sorted by CRC where CRC is the signature mechanism. The entries may be so sorted to aid in identifying matching signatures, or CRCs, as discussed below.

The reference volume may be determined under two circumstances. In the first, boot acceleration is being initially configured and thus no tables or boot cache are loaded. In this scenario, whichever volume first finishes boot statistics data collection can become the reference volume. In a second circumstance, tables and boot cache are already loaded. For this second scenario, the volume having the largest percentage of its data cached may become the reference volume. Having the most data cached may be identified by a "number of blocks" field of the SLT table as discussed below.

Turning now to FIG. 6, a data structure diagram 600 illustrates tables generated with respect to a reference volume for use in boot acceleration according to embodiments presented herein. A reference block array 610 can represent block numbers of a reference volume having only pure reads during the boot statistics collection period. A reference volume boot acceleration pattern (BAP) table 620 can also list the blocks of a reference volume having only pure reads during the boot statistic collection period. The reference volume BAP table 620 may also indicate the number of matching entries. The number of matching entries for a reference volume may be equal to the number of blocks having only pure reads during the boot statistics collection period.

A reference volume start LBA length table (SLT) 630 may represent identical information stored in the reference volume BAP table 620 but in a different format. The reference volume SLT tables 630 entries may each contain a start block, length in number of blocks, and a bitmap index. In the illustrated example, the reference volume BAP table 620 begins with blocks 1 and 2 but then does not contain block 3. Therefore, the first entry in the corresponding reference volume SLT table 630 starts at block 1 and has a length of 2 to correspond to the blocks 1 and 2 of reference volume BAP table 620. The next entry in the reference volume BAP table 620 is for block 5, however there is no entry for the number 6 indicating that block 6 did not have a pure read during the boot statistics collection period. Therefore, the second entry in the corresponding reference volume SLT table 630 has a start block of 5 and a length of 1, representing the run of consecutive blocks containing only the block 5. The next entry in the reference volume BAP table 620 is for block 7 followed by bock 8 and block 9 for a run of three consecutive blocks. Therefore, the third entry in the reference volume SLT table 630 has a start block of 7 and run length of 3, representing the three blocks of the reference volume BAP table 620 7, 8, and 9. Therefore, it should be appreciated that the reference volume SLT table 630 may contain similar information as the reference volume BAP table 620 in a more accessible format similar to a run length encoding (RLE).

The bitmap index field of the dependent volume SLT table 630 can point to the reference volume bitmap index. Thus the bitmap index can point to the block number of the reference volume. In this case of reference volume, the bitmap index may be merely the index of the array.

Turning now to FIG. 7, a data structure diagram 700 illustrates tables generated with respect to each dependent volume for use in boot acceleration according to embodiments presented herein. Each other volume than the reference volume is a dependent volume. Each dependent volume can have a dependent volume BAP table 720 and a dependent volume SLT table 740. As before, a reference block array 610 can represent block numbers of the reference volume having only pure reads during the boot statistics collection period. The dependent volume BAP table 720 can list the blocks of the reference volume having only pure reads during the boot statistic collection period and matching blocks within the dependent volume associated with the table. The dependent volume BAP table 720 may also indicate the number of matching entries. Here matching implies having both a matching signature and then also verified matching since matching signatures may not imply exact brute-force matches as well. The reference volume entries within the dependent volume BAP table 720 make up a reference block index and the dependent volume entries make up a dependent block index.

A dependent volume SLT table 730 may represent similar information as stored in the dependent volume BAP table 720 but in a different format. The dependent volume SLT tables 730 entries may each contain a start block, a length in number of blocks, and a bitmap index. In the illustrated example, the dependent block index within the dependent volume BAP table 720 begins with consecutive blocks 4, 5, and 6 and 5. However, only the first two entries, 4 and 5 have corresponding reference block index entries 1 and 2 that consecutively correspond to entries within the reference block array 610. While, the next entry of the dependent block index is 6 and appears to be consecutive, its corresponding dependent block index entry is 7, but the next entry in the reference block array 610 is 5, not 7. Thus, the first matching run from the dependent block index is 4 and 5 for a length of two. Therefore, the first entry in the corresponding dependent volume SLT table 730 starts at block 4 and has a length of 2 to correspond to the blocks 4 and 5 of the dependent block index from the dependent volume BAP table 720.

The next entry in the dependent block index from the dependent volume BAP table 720 is for block 6, however the following entry is not for the number 7. Therefore, the second entry in the corresponding dependent volume SLT table 730 has a start block of 6 and a length of 1, representing the run of consecutive blocks containing only the block 6. The next entry in the dependent block index from the dependent volume BAP table 720 is for block 10 followed by bock 11. The corresponding reference block index entries are 8 and 9 which are also consecutive in the reference block array 610, so the run length of the match is indeed two. Therefore, the third entry in the dependent volume SLT table 730 has a start block of 10 and run length of 2, representing the two blocks of dependent block index 10 and 11. Therefore, it should be appreciated that the dependent volume SLT table 730 may contain similar information as the dependent volume BAP table 720 in a more accessible format similar to a run length encoding (RLE) over both the dependent block index from the dependent volume BAP table 720 and the reference block array 610.

The bitmap index field of the dependent volume SLT table 730 can point to the reference volume bitmap index. Thus the bitmap index can point to the block number of the reference volume.

Figure 8:
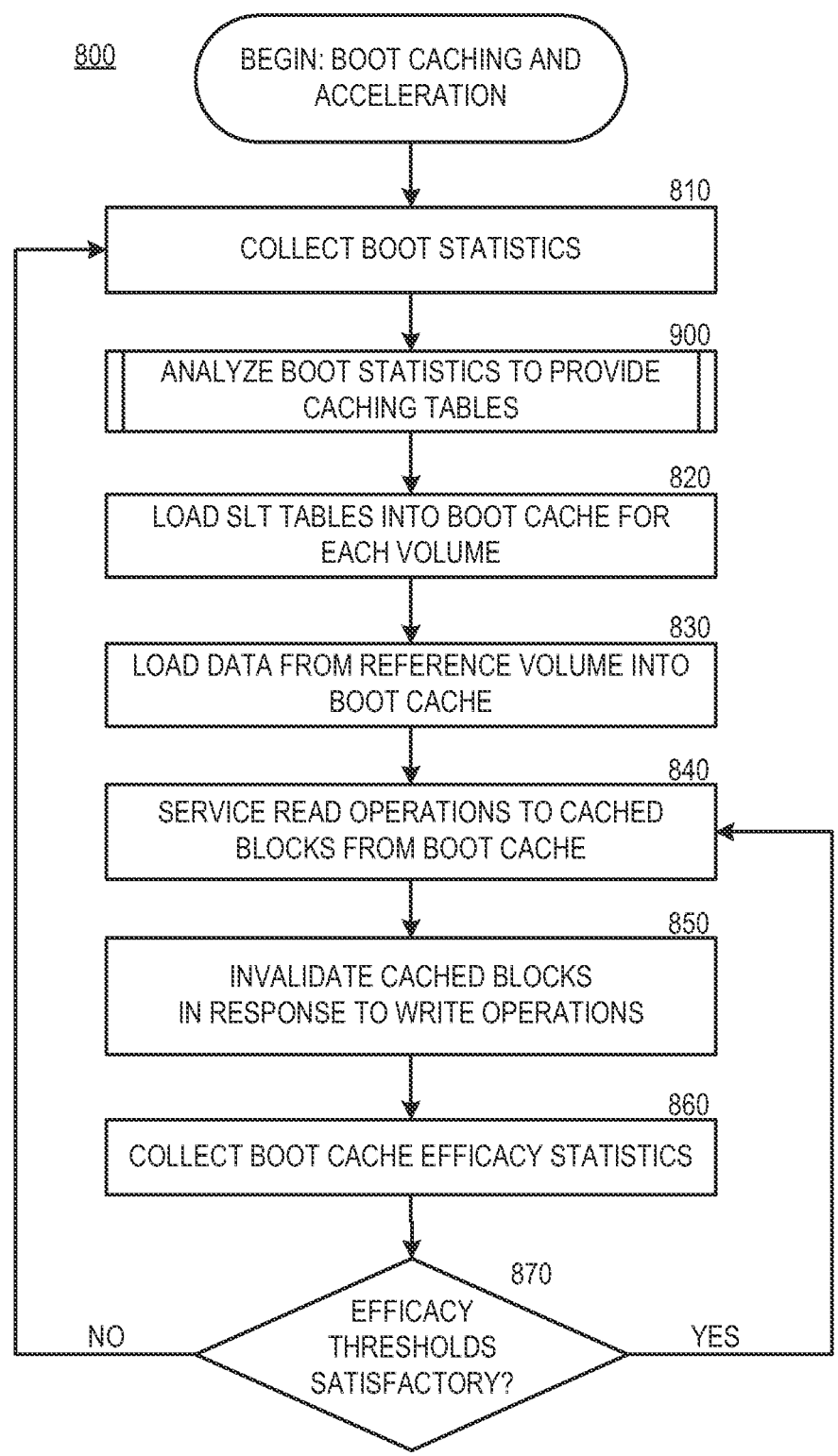
FIG. 8 is a logical flow diagram illustrating a process for boot caching and acceleration according to embodiments presented herein.

Turning now to FIG. 8, additional details will be provided regarding the embodiments presented herein for boot caching for boot acceleration within a data storage system. In particular, FIG. 8 is a flow diagram showing a routine 800 that illustrates aspects of a process for boot caching and acceleration according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 800 can begin with operation 810, where boot statistics are collected. For each volume supporting, collection, I/O operations may be stored as boot statistic entries into a boot pattern table 310 during the boot period. A boot period may begin when a volume is first accessed, or mounted, or when other boot signals are detected. The duration of the boot period may be specified by time or a particular number of I/O operations. Next, routine 900 may analyze the boot statistics collected in operation 810 to provide caching tables for use in the boot caching system.

At operation 820, the dependent volume SLT table 730 for each dependent volume and the reference volume SLT table 630 for the reference volume may be loaded into the boot caching system. At operation 830, blocks used from the reference volume may be loaded into the boot cache. The reference volume SLT table 630 may be consulted to load all of the reference volume blocks at once, or blocks may be read from disk into the cache according to their initial access.

At operation 840, reads from cached blocks may be services by the boot cache. Reads from the cached blocks by either the reference volume or a dependent volume may be serviced from the boot cache instead of incurring a disk access to read the block.

At operation 850, write operations to cached blocks cause cache invalidations. When a write operation is received to a cached block of a dependent volume, the dependency may be broken and future accesses to that volume and block will be serviced from disk and no longer cached. When a write operation is received to a cached block of a reference volume, the entire caching of that block may be broken. Subsequent accesses to that block from any of the dependent volumes or the reference volume may be serviced from disk and not the boot cache since the entire boot caching of that block may have been invalidated.

At operation 860, boot cache efficacy statistics may be collected. For example, the number of writes, and thus invalidations, to boot cache blocks may be stored to a statistics collection mechanism. Similarly, statistics may be collected on how many dependent volume accesses are made to blocks in boot cache. This may serve as an indicator as to how much use the thin clients 210 are making of the boot caching service.

At operation 870, it can be determined if boot cache efficacy statistics are satisfactory. When one, or some combination, of the boot cache efficacy statistics collected in operation 860 exceed predefined thresholds, the caching tables may be recomputed in an attempt to reestablish boot caching in a more effective state. Thus, when it is determined, at operation 870, that efficacy thresholds are not satisfactory, the routine 800 may loop back to operation 810 where new boot statistics may be collected and the caching process may reset and begin anew. Otherwise, if efficacy thresholds are satisfactory, the routine 800 may loop back to operation 840 to continue to operate the boot cache as currently implemented.

Figure 9:
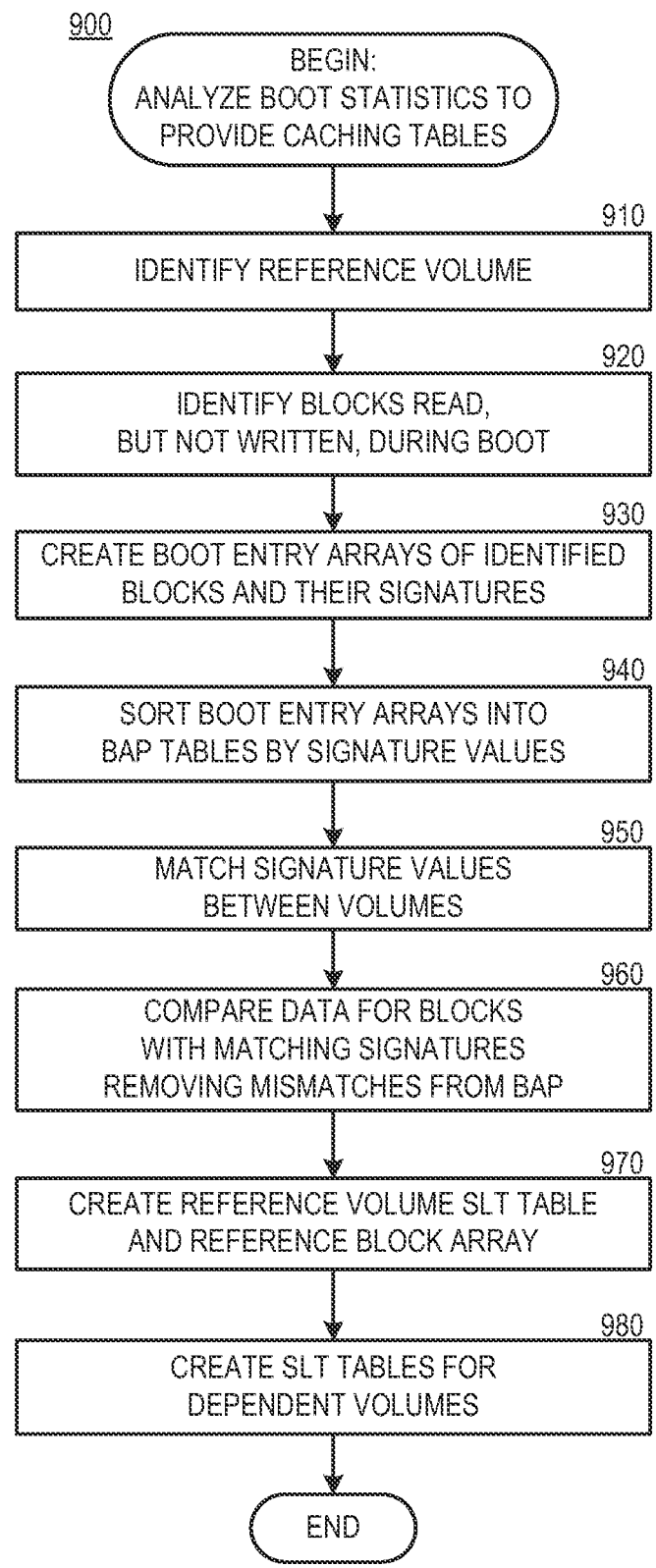
FIG. 9 is a logical flow diagram illustrating a process for analyzing boot statistics to provide caching tables according to embodiments presented herein.

Turning now to FIG. 9, additional details will be provided regarding the embodiments presented herein for boot caching for boot acceleration within a data storage system. In particular, FIG. 9 is a flow diagram showing a routine 900 that illustrates aspects of a process for analyzing boot statistics to provide caching tables according to embodiments presented herein. The routine 900 can begin with operation 910, where the reference volume may be identified. The reference volume may be determined under two circumstances. In the first, boot acceleration is being initially configured and thus no tables or boot cache are loaded. In this scenario, whichever volume first finishes boot statistics data collection can become the reference volume. In a second circumstance, tables and boot cache are already loaded. For this second scenario, the volume having the largest percentage of its data cached may become the reference volume. Having the most data cached may be identified by a "number of blocks" field of the SLT table as discussed below.

At operation 920, blocks may be identified that were read, but not written to, during the boot periods. These blocks may be said to be pure read I/O blocks. Such blocks are useful for boot caching because they have not been, and thus may continue to not be, modified by write I/O operations. Write bitmaps, and pure read bitmaps may be used to determine these blocks as discussed with respect to FIG. 4.

At operation 930, boot entry arrays 510, 520 may be generated. These arrays may contain the identified blocks from operation 920 and their signatures. The signatures may be, for example, CRC values.

At operation 940, the boot entry arrays 510, 520 may be sorted to form the BAP tables 620, 720. The sorting may be based on the signature values to expedite later matching of the blocks by signature, or CRC, value.

At operation 950, blocks having matching signature values may be associated. Block numbers may be identified that have matching signatures between the reference volume index 510 and dependent volume index 520. The matching blocks may be associated within a dependent volume BAP table 720.

At operation 960, data comparison may be performed for blocks having matching signatures. Although signatures, such as CRCs, may match for a pair of blocks, there remains a possibility that the data might not entirely match. Thus, the actual data may be compared after signatures are matched. Block numbers may be removed from the dependent volume BAP table 720 when there are data mismatches.

At operation 970, the reference block array 610 may contain the block list from the reference index of the reference volume BAP table 620. Also, the reference volume SLT table 630 may be formed from the reference volume BAP table 620. Entries to the reference volume SLT table 630 may be formed starting with an initial length of one and a bitmap index set to the index of the start block in the reference volume BAP table 620. When each next block number is consecutive from the previous block number, the length may be incremented by one. If the next block is not consecutive from the last, the start block, length, and bitmap index are used to form an entry into the reference volume SLT table 630. A next entry may be started with the next block number and the length may be reset to one. The bitmap index may be the index of the current start block in the reference block array of the reference volume BAP table 620. This may be repeated until the blocks in the reference volume BAP table 620 have been accounted for.

At operation 980, a dependent volume SLT table 730 may be formed for each of the dependent volumes. A dependent volume SLT table 730 may be calculated using the corresponding dependent volume BAP table 720. Entries to the dependent volume SLT table 730 may be formed starting with an initial length of one. When each next dependent volume index 520 block number is consecutive from the previous block number, and the corresponding reference volume index 510 block number is consecutive within the reference block array 610, the length may be incremented by one. Otherwise, the start block, length, and bitmap index are used to form an entry into the dependent volume SLT table 730. A next entry may be started with the next block number and the length may be reset to one. This is similar to the process used for the reference volume SLT table 630 with the added run length requirement that the reference blocks also be consecutive in the reference block array 610. This may be repeated until the blocks in the dependent volume index 520 of the dependent volume BAP table 720 have been accounted for. The routine 900 may terminate after operation 980.

Figure 10:
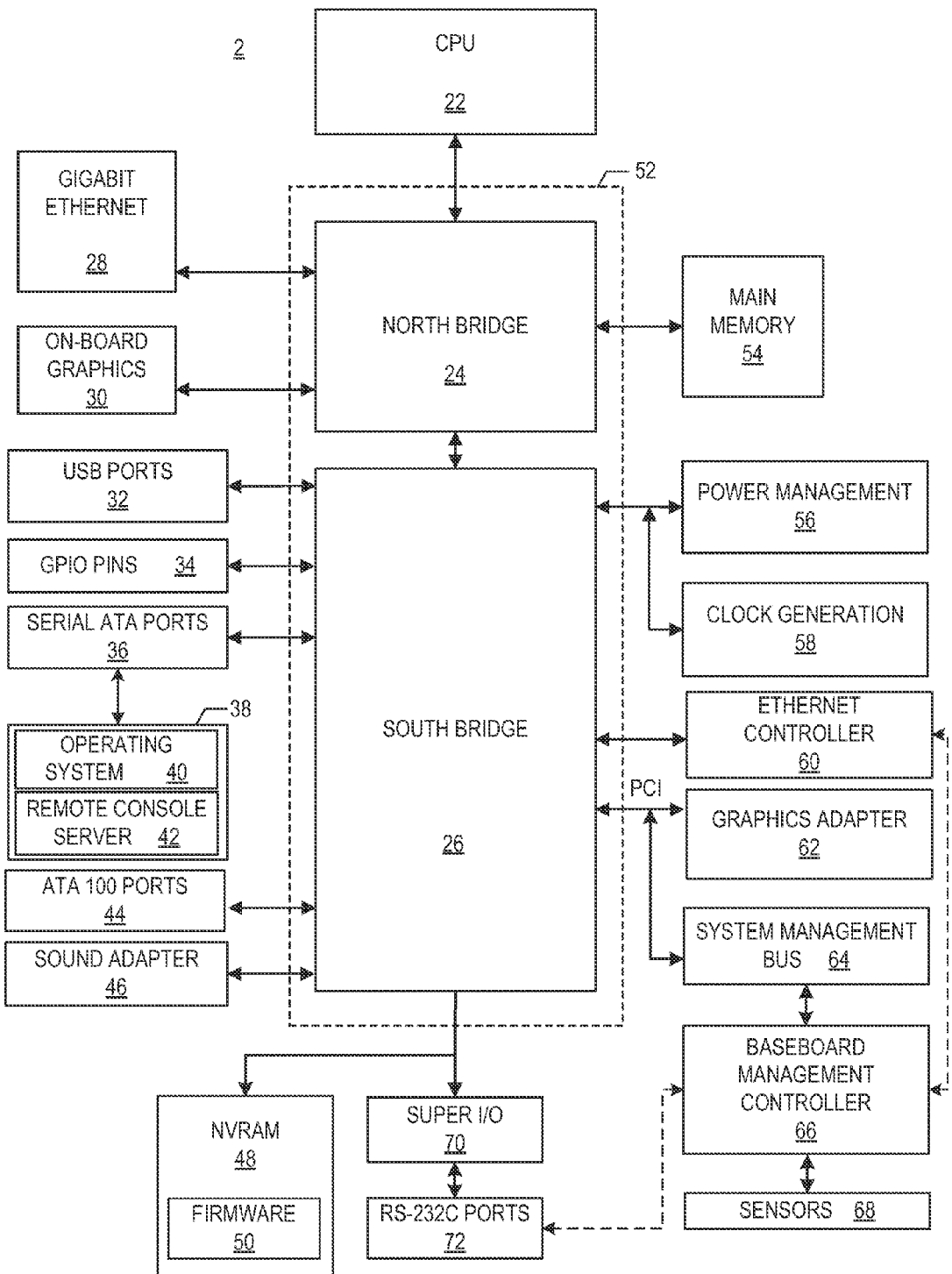
FIG. 10 is a computer architecture diagram illustrating a computer hardware architecture for a computing system capable of boot caching and boot acceleration according to embodiments presented herein.

FIG. 10 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 10 shows an illustrative computer architecture for a storage server computer 2 that may be utilized in the implementations described herein. Such an illustrative computer system may also describe a client computer system 8A-8N, a thin client 210, or the controller of a SAN device 230. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory (RAM) used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus (USB) ports 32, a sound adapter 46, an Ethernet controller 60, and one or more general purpose input/output (GPIO) pins 34. The south bridge 26 may also provide a bus for interfacing peripheral card devices such as a graphics adapter 62. In one embodiment, the bus comprises a peripheral component interconnect (PCI) bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment (SATA) adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 2.

A low pin count (LPC) interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 10, may include other components that are not explicitly shown in FIG. 10, or may utilize an architecture completely different than that shown in FIG. 10.

Based on the foregoing, it should be appreciated that technologies for boot caching and boot acceleration are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for boot acceleration within a data storage system, the method comprising:
    collecting boot statistics related to boot load operations for a plurality of thin client devices;
    analyzing the boot statistics;
    providing boot cache tables in response to analyzing the boot statistics;
    providing a boot cache in memory;
    loading the boot cache tables into the boot cache;
    analyzing the boot cache tables to determine common boot blocks, wherein the common boot blocks are accessed by at least two of the thin client devices during the boot load operations;
    upon determining the common boot blocks, loading the common boot blocks into the boot cache; and servicing the boot load operations for the thin client devices from the common boot blocks in the boot cache over a network.

2. The method of claim 1, further comprising:
invalidating one or more of the common boot blocks in response to write operations by at least one of the thin client devices to the one or more of the common boot blocks;
maintaining a list of the invalidated common boot blocks; and
in response to an input/output ("I/O") operation by the at least one of the thin client devices directed to the invalidated common boot blocks, bypassing the boot cache and redirecting the I/O operation to a physical storage device.

3. The method of claim 1, further comprising collecting boot cache efficacy statistics.

4. The method of claim 3, further comprising rebuilding the boot cache in response to the boot efficacy statistics falling below a specified threshold.

5. The method of claim 1, further comprising associating dependent blocks to reference blocks based on signature values.

6. The method of claim 5, further comprising matching data between the associated dependent blocks and reference blocks, and removing mismatched blocks from the boot cache tables.

7. The method of claim 1, further comprising establishing a reference volume as a volume having a highest number of matching blocks.

8. A non-transitory computer storage medium having computer-executable instructions stored thereon which, when executed by a computer system, cause the computer system to:
collect boot statistics related to boot load operations for a plurality of thin client devices;
analyze the boot statistics;
provide boot cache tables in response to analyzing the boot statistics;
provide a boot cache in memory;
load the boot cache tables into the boot cache;
analyze the boot cache tables to determine common boot blocks, wherein the common boot blocks are accessed by at least two of the thin client devices during the boot load operations;
upon determining the common boot blocks, load the common boot blocks into the boot cache; and
service the boot load operations for the thin client devices from the common boot blocks in the boot cache over a network.

9. The non-transitory computer storage medium of claim 8, having further computer-executable instructions stored thereon which, when executed by the computer system, cause the computer system to:
invalidate one or more of the common boot blocks in response to write operations by at least one of the thin client devices to the one or more of the common boot blocks;
maintain a list of the invalidated common boot blocks; and
in response to an input/output ("I/O") operation by the at least one of the thin client devices directed to the invalidated common boot blocks, bypass the boot cache and redirect the I/O operation to a physical storage device.

10. The non-transitory computer storage medium of claim 8, having further computer-executable instructions stored thereon which, when executed by the computer system, cause the computer system to collect boot cache efficacy statistics.

11. The non-transitory computer storage medium of claim 10, having further computer-executable instructions stored thereon which, when executed by the computer system, cause the computer system to rebuild the boot cache in response to the boot efficacy statistics falling below a specified threshold.

12. The non-transitory computer storage medium of claim 8, having further computer-executable instructions stored thereon which, when executed by the computer system, cause the computer system to associate dependent blocks to reference blocks based on signature values.

13. The non-transitory computer storage medium of claim 12, having further computer-executable instructions stored thereon which, when executed by the computer system, cause the computer system to match data between the associated dependent blocks and reference blocks, and remove mismatched blocks from the boot cache tables.

14. The non-transitory computer storage medium of claim 8, having further computer-executable instructions stored thereon which, when executed by the computer system, cause the computer system to establish a reference volume as a volume having a highest number of matching blocks.

15. A data storage system comprising:
a storage server;
a physical storage device associated with the storage server;
a processing unit associated with the storage server; and
one or more modules for execution on the processing unit, the one or more modules being configured to:
collect boot statistics related to boot load operations for a plurality of thin client devices,
analyze the boot statistics,
provide boot cache tables in response to analyzing the boot statistics,
provide a boot cache in memory,
load the boot cache tables into the boot cache,
analyze the boot cache tables to determine common boot blocks, wherein the common boot blocks are accessed by at least two of the thin client devices during the boot load operations,
upon determining the common boot blocks, load the common boot blocks into the boot cache, and
service the boot load operations for the thin client devices from the common boot blocks in the boot cache over a network.

16. The data storage system of claim 15, wherein the one or more modules for execution on the processing unit are further configured to:
invalidate one or more of the common boot blocks in response to write operations to the one or more of the common boot blocks;
maintain a list of the invalidated common boot blocks; and
in response to an input/output ("I/O") operation by the at least one of the thin client devices directed to the invalidated common boot blocks, bypass the boot cache and redirect the I/O operation to the physical storage device.

17. The data storage system of claim 15, wherein the one or more modules for execution on the processing unit are further configured to collect boot cache efficacy statistics.

18. The data storage system of claim 17, wherein the one or more modules for execution on the processing unit are further configured to rebuild the boot cache in response to the boot efficacy statistics falling below a specified threshold.

19. The data storage system of claim 15, wherein the one or more modules for execution on the processing unit are further configured to associate dependent blocks to reference blocks based on signature values.

20. The data storage system of claim 19, wherein the one or more modules for execution on the processing unit are further configured to match data between the associated dependent blocks and reference blocks, and remove mismatched blocks from the boot cache tables.

* * * * *